United States Patent [19]

Otsuka et al.

[11] Patent Number: 5,065,851
[45] Date of Patent: Nov. 19, 1991

[54] CLUTCH CONTROL UNIT

[75] Inventors: Masuhiro Otsuka; Hiromi Kono, both of Saitama, Japan

[73] Assignee: Zexel Corporation, Tokyo, Japan

[21] Appl. No.: 556,381

[22] Filed: Jul. 23, 1990

[30] Foreign Application Priority Data

Jul. 24, 1989 [JP] Japan ................................. 1-190877

[51] Int. Cl.$^5$ ............................................. F16D 43/00
[52] U.S. Cl. ............................ 192/103 R; 192/111 A
[58] Field of Search ............... 192/0.032, 0.033, 0.076, 192/103 R, 111 A

[56] References Cited

U.S. PATENT DOCUMENTS

| 4,023,660 | 5/1977 | Dickinson | 192/111 A X |
| 4,497,397 | 2/1985 | Windsor et al. | 192/0.076 |
| 4,561,560 | 12/1985 | Parsons et al. | 192/0.076 |
| 4,591,038 | 5/1986 | Asagi et al. | 192/103 R X |
| 4,646,891 | 3/1987 | Braun | 192/0.032 |
| 4,678,069 | 7/1987 | Yoshimura et al. | 192/0.033 |
| 4,790,420 | 12/1988 | Hata et al. | 192/111 A |

FOREIGN PATENT DOCUMENTS

| 3443064 | 6/1986 | Fed. Rep. of Germany . | |
| 59-65625 | 4/1984 | Japan | 192/111 A |
| 60-1450 | 1/1985 | Japan | 192/0.033 |
| 60-11722 | 1/1985 | Japan | 192/111 A |
| 60-034525 | 2/1985 | Japan . | |
| 60-168921 | 9/1985 | Japan | 192/111 A |
| 61-271136 | 12/1986 | Japan | 192/103 R |
| 1-193416 | 8/1989 | Japan | 192/111 A |

Primary Examiner—Richard Lorence
Attorney, Agent, or Firm—Kanesaka & Takeuchi

[57] ABSTRACT

A clutch control unit includes a clutch learning unit (4b) for determining a clutch connection characteristic (M) based on the clutch position at which the number of revolutions of an output shaft of the clutch reaches a predetermined value when the clutch is moved toward connection from a predetermined learning starting point and a clutch off detector (4c) for determining a clutch off point at which the number of revolutions of the output shaft is zero by moving the clutch toward disconnection and taking as a new learning starting point the clutch off point or a point made by adding a small offset value to the clutch off point, thereby controlling the clutch based on the clutch connection characteristic (M).

2 Claims, 4 Drawing Sheets

CLUTCH CONTROL UNIT

BACKGROUND OF THE INVENTION

1. Field of the Invention

The present invention relates generally to clutch control units for vehicles and, more particularly, to a clutch control unit capable of automatically connect or disconnect the clutch by learning.

2. Description of the Prior Art

FIG. 4 shows an automatic transmission including a conventional clutch control unit. A well-known parallel gear type transmission 1 is controlled by a transmission actuator 2 which consists of a select actuator shift actuator 2b. Both of the actuators 2a and 2b are driven by a hydraulic drive system 3 which consists of a tank 3a, a pump 3b, an accumulator 3c, and a hydraulic pressure switching electromagnetic valve (not shown) to control the transmission 1 via piston rods 2c and 2d. This control is made by the central processing unit (CPU) of a drive unit (D/U) 2e which in turn is controlled by a main control unit (C/U) 4 having a CPU, a read only memory (ROM), and a random access memory (RAM) through serial communications. A pair of potentiometers 2f and 2g are provided to detect the positions of the piston rods 2c and 2d, respectively. The actual position signals of the respective potentiometers 2c and 2d are fed back to the transmission drive unit 2e to control the gear positions so that they agree with the target position signals. An input shaft sensor 5a is provided to detect the number of revolutions v of an input shaft 1a of the transmission 1. A vehicle speed sensor 5b is provided to detect the number of revolutions V' of an output shaft 1b of the transmission 1 or the vehicle speed. The outputs of the respective sensors 5a and 5b are inputted to the main control unit 4.

A clutch 6 is interlocked to the piston rod 7a of a clutch actuator 7 to make connection or disconnection. The hydraulic pressure is supplied to the clutch actuator 7 by the hydraulic drive system 3 to perform a feedback control by the CPU of the clutch drive unit 7b so that the position signal of the piston rod 7a detected by the potentiometer 7c agrees with the target position signal from the main control unit 4. The clutch drive unit 7b is also controlled by the main control unit 4 through serial communications. An engine 8 has a control unit 8a which is controlled by the main control unit 4. An engine revolution sensor 9 is provided to detect the number of revolutions V of an output shaft 8b of the engine 8. The revolutions of the engine 8 are transmitted to an axle 10 via the clutch 6 and the transmission 1. The output of the engine revolution sensor 9 is inputted to the main control unit 4, into which signals from an acceleration pedal sensor 11, a brake pedal sensor 12, a key switch 13, an exhaust brake switch 14, and a gear position selector 15 are also inputted to control the transmission drive unit 2e, the clutch drive unit 7b, the engine control unit 9, a display panel 16, and a control unit 17a which controls a gear position display panel 17.

In this way, the main control unit 4 controls the clutch 6 and the transmission 1 according to the amount of pressing the acceleration pedal, the vehicle speed, and the shift position of the gear position selector. The gear position is controlled by the select actuator 2a and the shift actuator 2b corresponding to the shift of the gear position selector 15 in the select or shift direction from the neutral position N. That is, it is controlled into the first, second, third, or reverse position when the set position is "1", "2", "3" or "R". However, when the set position is "D4" or "D5" or automatic shift position, it is controlled according to the gearshift map based on the amount of pressing the acceleration pedal and the vehicle speed; i.e., automatic shift is made between the first and fourth gears at "D4" and between the second and fifth gears at "D5".

The control of connection or disconnection of the clutch 6 is made before and after the shift control by the main control unit 4 via the clutch drive unit 7b and the clutch actuator 7. This control is made based on the clutch connection characteristic obtained from learning activities made at a predetermined point of time.

FIG. 3(a) shows a learning activity. A learning starting point S has been stored in a memory of the main control unit 4. A half clutch point F is determined by moving the clutch 6 from the learning starting point S toward connection until the number of revolutions v detected by the input shaft sensor 5a becomes slightly greater than 0. Then, the clutch action starting point Q and the clutch connection completion point P are determined by taking predetermined offset values (operation distance) $l_1$ and $l_2$ from the half clutch point F in the directions of disconnection and connection, respectively. The clutch connection characteristic M is drawn from the half clutch point F, the clutch connection completion point P, and the clutch action starting point Q and stored in the memory. In the next learning activity, the previous clutch action starting point Q is taken as a present learning starting point S to start a learning activity similar to the above. By controlling the connection or disconnection of the clutch 6 according to the clutch connection characteristic M obtained from such learning activity, it is possible to reduce not only the wear of the clutch 6 but also the operational stroke of the clutch 6, thus making the shift operation faster.

With the conventional clutch control unit, the clutch action starting point Q, which is determined from the learning value stored in the memory of the main control unit, is taken as a learning starting point S to connect the clutch gradually, and the half clutch point F at which the input shaft of a transmission starts to rotate is taken as a learning point. However, when the clutch plate or actuator is replaced, the actual learning point can be far different from the learning value stored in the memory, and the clutch can have already been connected at the predetermined learning starting point S (clutch action starting point Q). As shown in FIG. 3(b), if the number of revolutions of the input shaft is shifted with respect to the clutch position, it is impossible to learn because the number of revolutions of the input shaft $v \neq 0$ (rpm). Accordingly, extremely accurate positioning has been required for replacing the clutch plate or actuator.

Japanese Patent Application Kokai No. 60-34525 has proposed that clutch connection completion and connection starting points are determined by learning activities and added to the previous values to determine a new clutch operation range. However, it has had the same disadvantage as the above. In addition, the previous learning values always have a great influence so that a large number of learning cycles are required to provide an appropriate learning value.

SUMMARY OF THE INVENTION

Accordingly, it is an object of the invention to provide a clutch control unit capable of continuing a learning activity without severe positioning requirements when the clutch plate or actuator is replaced and providing an appropriate learning value in a single cycle of learning activity.

According to the invention there is provided a clutch control unit which includes a clutch; a clutch control unit for controlling the clutch; a first sensor for detecting the number of revolutions of an input shaft of the clutch; a second sensor for detecting the number of revolutions of an output shaft of the clutch; a clutch learning unit for determining a clutch position at which the number of revolutions reaches a predetermined value by moving the clutch toward connection from a predetermined learning starting point (S) and controlling the clutch control unit based on the clutch position thus determined; a clutch off detector for determining, when the number of revolutions of the output shaft of the clutch is not zero with the clutch at the learning starting point (S), a clutch off point (R) at which the number of revolutions of the output shaft is zero by moving the clutch toward disconnection or a point made by adding a small offset value to the clutch off point (R); and the clutch learning unit starting a learning activity by taking the clutch off point (R) or the point as a new learning starting point (S).

When the number of revolutions of the output shaft is not zero with the clutch at the learning starting point (S) stored in the memory, or the clutch is connected, the clutch off detector moves the clutch toward disconnection to determine a clutch off point (R) at which the number of revolutions of the output shaft is zero or a point made by adding a small offset value to the clutch off point (R). The clutch learning unit starts a learning activity by taking the clutch off point (R) as a new learning starting point (S) independent of the previous learning value so that it is possible to learn without severe positioning requirements for part replacements and provide an appropriate learning value in a single cycle of learning activity.

The above and other objects, features, and advantages of the invention will become more apparent from following description when taken in conjunction with the accompanying drawings.

DESCRIPTION OF THE PREFERRED EMBODIMENT

Figure 1:
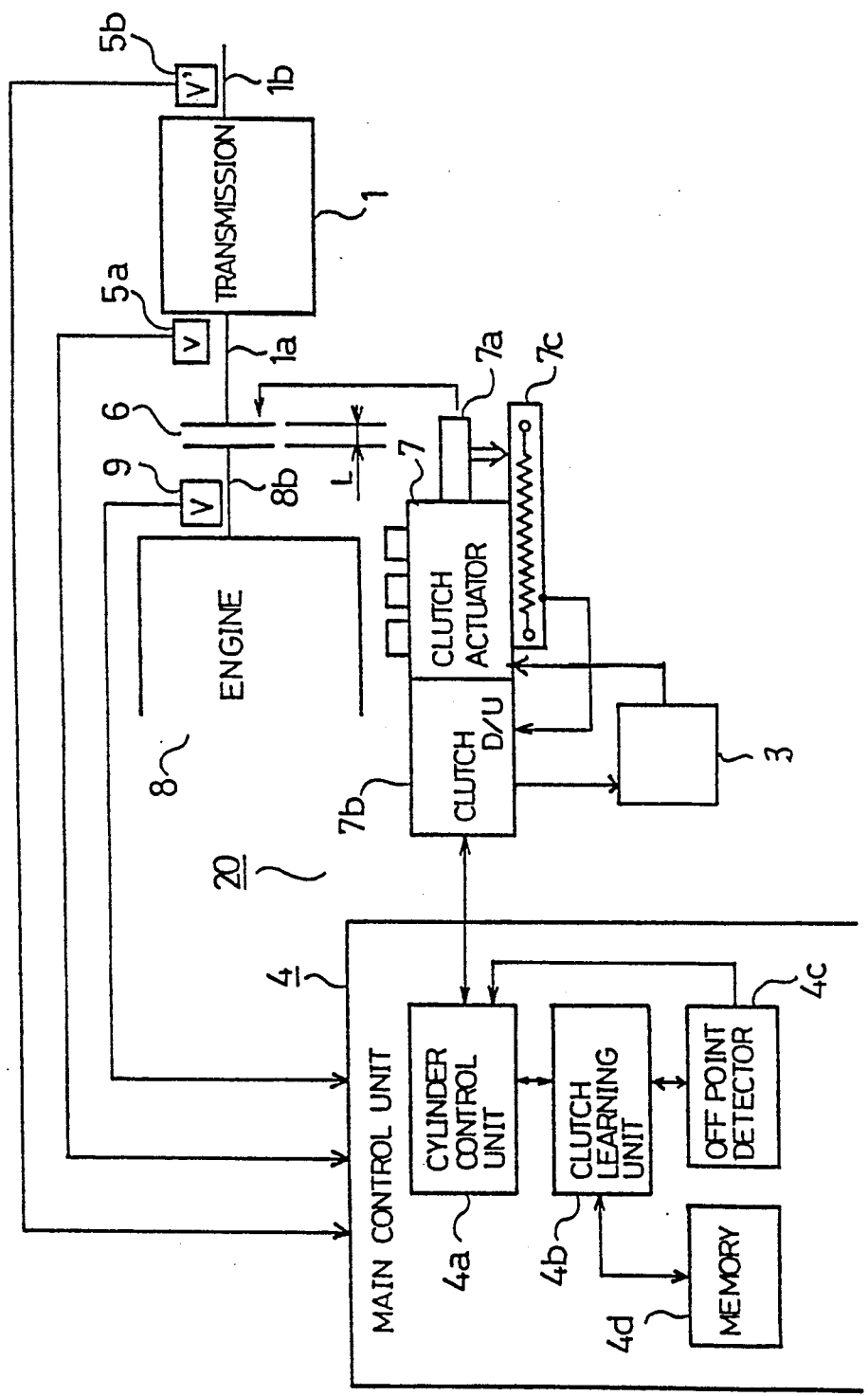
FIG. 1 is a schematic diagram of a clutch control unit according to an embodiment of the invention.
Figure 2:
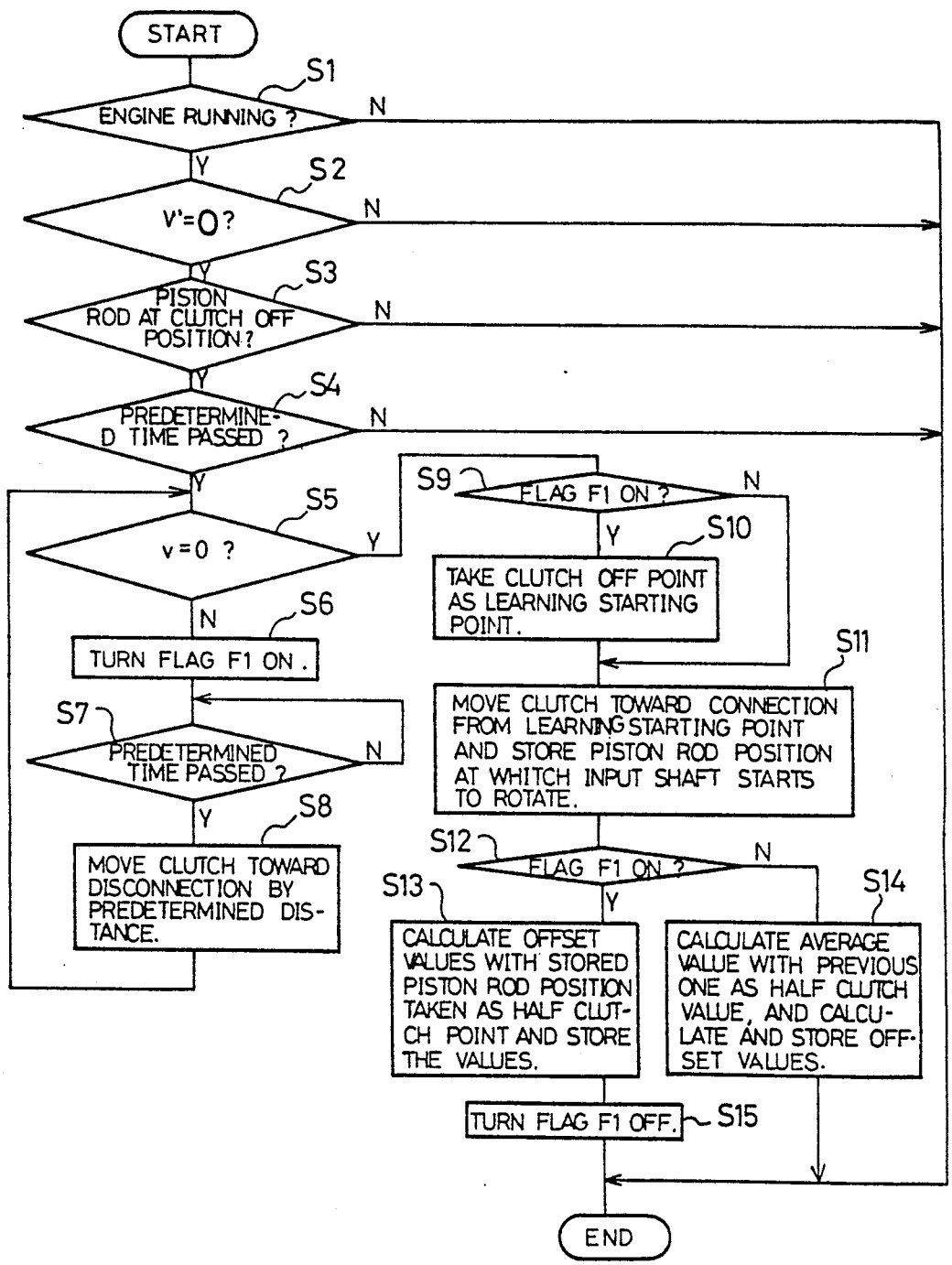
FIG. 2 a flowchart useful for explaining how the clutch control unit works.
Figure 3:
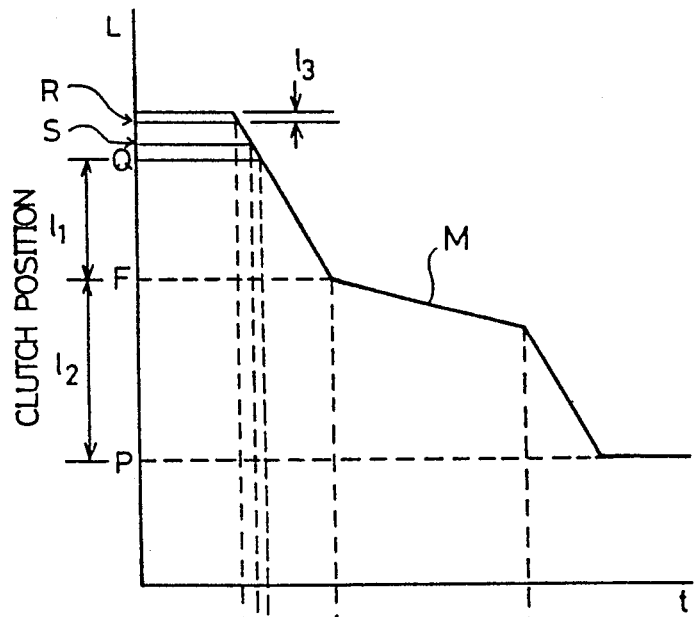
FIG. 3(a) and 3(b) are graphs useful for explaining a learning activity.
Figure 3:
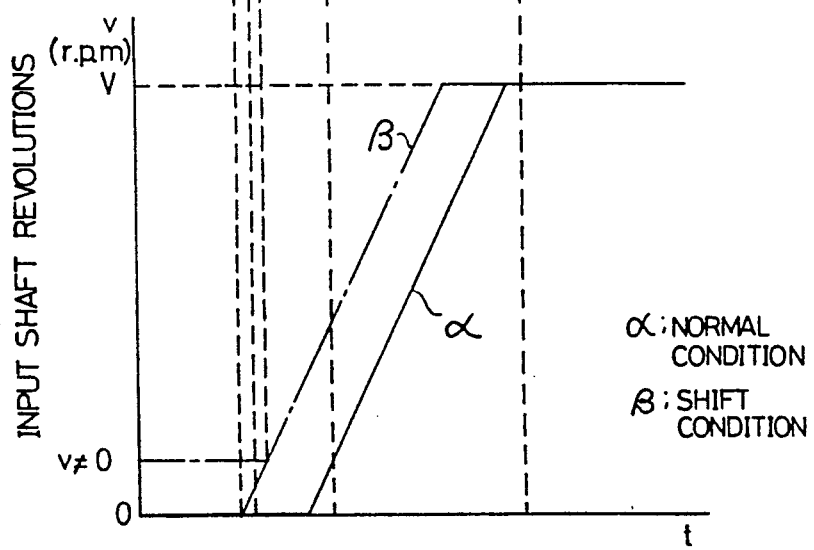
Figure 4:
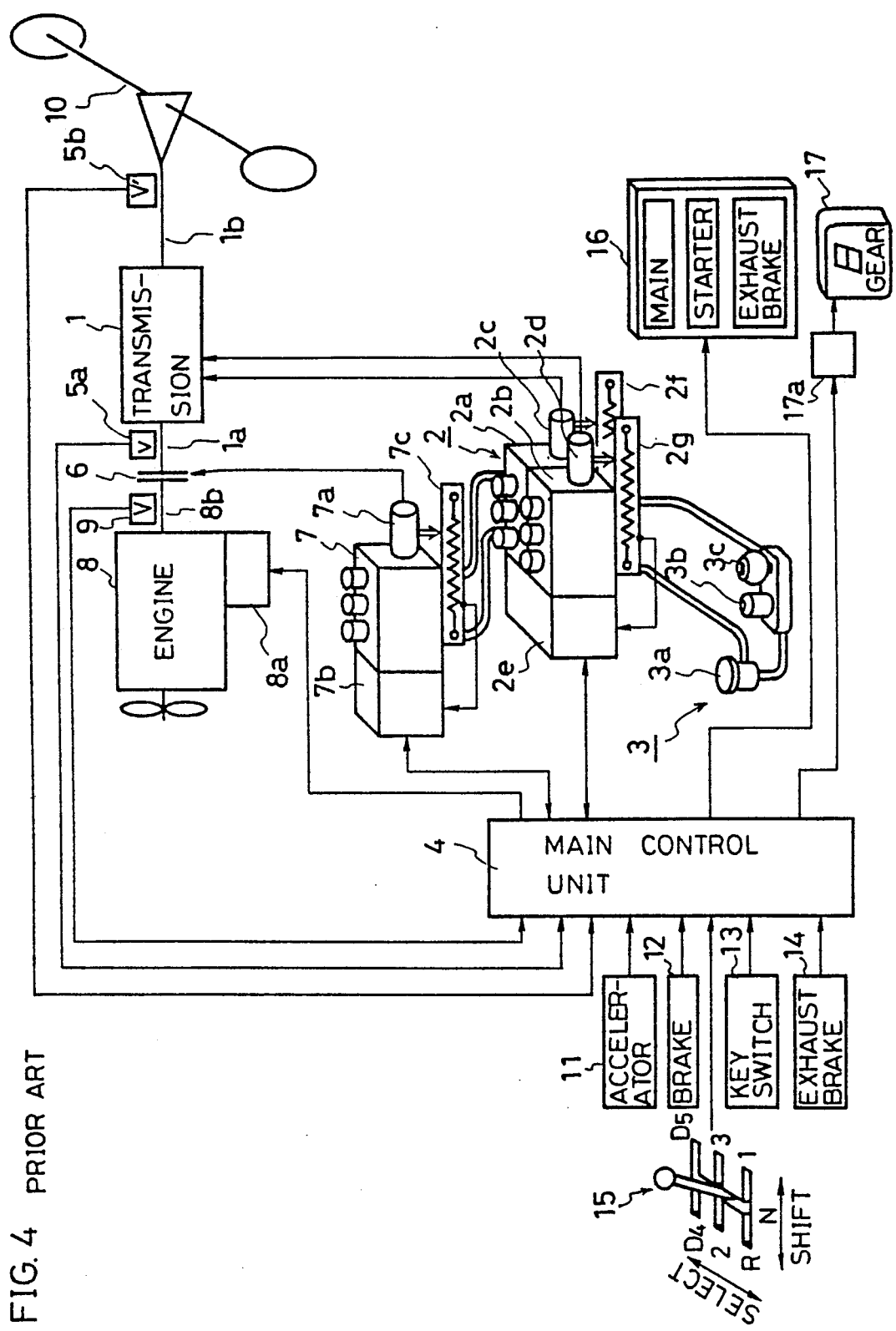
FIG. 4 is a schematic diagram of an automatic transmission including a clutch control unit.

Like reference characters in FIGS. 1-3 denote like or corresponding parts or components of FIG. 4 and, therefore, their description will be omitted.

In FIG. 1, a cylinder controls unit 4a controls the hydraulic drive system 3 via the clutch drive unit 7b, thereby controlling the cylinder of the clutch actuator 7. The cylinder control unit 4a, the clutch drive unit 7b, and the clutch actuator 7 constitute a clutch control unit 20. A clutch learning unit 4b starts a learning activity when predetermined conditions are met and controls the cylinder control unit 4a according to the clutch connection characteristic obtained from the learning activity. If the number of revolutions v of the input shaft 1a is not zero or the clutch 6 is virtually connected even when the clutch position (the position of the piston rod 7a)is at the learning starting point S, an off point detector 4c finds a clutch off point by gradually moving the clutch 6 in the direction of disconnection by predetermined increments until the number of revolutions v of the input shaft 1a becomes zero and feeds this clutch off point to the clutch learning unit 4b. A memory 4d stores both the clutch connection characteristic obtained from this learning activity and a control flag F1 to be described later. The clutch learning unit 4b has substantially the same function as the conventional one as well as a function for starting a learning activity with the clutch off point by the off point detector 4c taken as a new learning starting point. The cylinder control unit 4a, the clutch learning unit 4b, and the off point detector 4c, and the memory 4d are implemented in the CPU of the main control unit 4 and by RAM, respectively. The engine revolution sensor 9 and the input shaft sensor 5a correspond to the first and second The operation of the clutch control unit will be described with respect to FIGS. 2 and 3. First of all, the conditions for starting a learning activity are checked in Steps S1-S4. More specifically, in Step S1, whether the engine 8 is running is determined by checking the number of revolutions V which is detected by the engine revolution sensor 9. In Step S2, whether the vehicle is stopped is determined by checking the vehicle speed V' which is detected by the output shaft sensor 5b of the transmission 1. In Step S3, whether the clutch 6 is in the off state at the clutch action starting point Q (learning starting point S) is determined by checking the position of the piston rod 7a which is detected by the potentiometer 7c. Finally, in Step S4, whether the above respective conditions remain for a predetermined period of time is determined. If they remain, the operation goes to Step S5 because the conditions for starting a learning activity are met.

In Step S5, whether the clutch 6 is off or v = 0 is determined by checking the number of revolutions v which is detected by the input shaft sensor 5a of the transmission 1. Normally, v = 0, and the operation goes to Step S9. Since the flag F1 also remains off, the operation goes to Step S11. In Step S11, the clutch 6 is gradually moved toward connection from the learning starting point S, and the position of the piston rod 7a at which the input shaft 1a starts to rotate is stored in the memory 4d. In Step S12, since the flag F1 is off, the operation goes to Step S14. In Step S14, the value stored in the Step S11 and the previous half clutch point F are averaged to provide a new half clutch point F. A clutch operation starting point Q and a clutch connection completion point P are determined by calculating predetermined offset values $l_1$ and $l_2$ from the new half clutch point F. The clutch connection characteristic M determined by these points Q, F, and P is stored in the memory 4d, thus completing one cycle of learning activity. In the subsequent driving, the clutch is controlled according to the clutch connection characteristic M determined by the above points Q, F, and P.

If the input shaft characteristic $\alpha$ shifted to $\beta$ because of the replacement of a part or component, v ≠ 0 in Step S5. That is, if the clutch 6 is still connected, the operation goes to Step S6 in which the flag F1 is turned on. After a predetermined period of time has passed in Step S7, the clutch 6 is moved for a predetermined distance in the direction of disconnection in Step S8. The above steps S5-S8 are repeated and, when v = 0, the operation goes from Step S5 to Step S9 in which whether the flag F1 is on is checked. Since the flag F1 is on as described above, the clutch off point R is taken as a learning starting point S in Step S10. In Step S11, the clutch 6 is gradually moved toward connection from the new learning starting point S, and the position of the piston rod $7a$ at which the input shaft $1a$ starts to rotate is stored in the memory $4d$. In Step S12, since the flag F1 is on, the operation goes to Step S13 in which offset values $l_1$ and $l_2$ are calculated with the piston rod position taken as a half clutch point F, and a new clutch connection characteristic determined by new half clutch, clutch connection completion, and clutch operation starting points is stored in the memory $4d$. Finally, in Step S15, the flag F1 is turned off, ending the learning activity.

As has been described above, it is possible to do a learning activity without severe positioning in the replacement of a part or component, such as the clutch plate or actuator, and provide an appropriate learning value in a single cycle of learning activity because it is unnecessary to average learning values.

We claim:

1. A clutch control system comprising:

a clutch;

a clutch control unit for controlling said clutch;

a sensor for detecting the number of revolutions of an output shaft of said clutch;

a clutch learning unit for determining a clutch position at which said number of revolutions is equal to a predetermined value by moving said clutch toward connection from a predetermined learning starting point and controlling said clutch control unit based on said clutch position thus determined;

a clutch off point detector for determining, if said number of revolutions is not zero when said clutch is at said learning starting point, a clutch off point at which said number of revolutions is zero by moving said clutch toward disconnection until said number of revolutions becomes zero; and said clutch learning unit starting a learning activity by taking said clutch off point as a new learning starting point.

2. A clutch control system comprising:

a clutch;

a clutch control unit for controlling said clutch;

a sensor for detecting the number of revolutions of an output shaft of said clutch;

a clutch learning unit for determining a clutch position at which said number of revolutions is equal to a predetermined value by moving said clutch toward connection from a predetermined learning starting point and controlling said clutch control unit based on said clutch position thus determined;

a clutch off point detector for determining, if said number of revolutions is not zero when said clutch is at said learning starting point, a clutch off point at which said number of revolutions is zero by moving said clutch toward disconnection until said number of revolutions becomes zero; and said clutch learning unit starts a learning activity by taking a sum of said clutch off point and a predetermined offset value as a new learning starting point.

* * * * *